June 16, 1942. H. QUINN 2,286,507
NONCOLLAPSIBLE PNEUMATIC TIRE
Filed April 26, 1941  4 Sheets-Sheet 3

Inventor
Hubert Quinn
By Thomas A. Jenkins
Attorney

June 16, 1942.    H. QUINN    2,286,507

NONCOLLAPSIBLE PNEUMATIC TIRE

Filed April 26, 1941    4 Sheets-Sheet 4

Inventor
Hubert Quinn
By Thomas A. Jenkins
Attorney

Patented June 16, 1942

2,286,507

UNITED STATES PATENT OFFICE 2,286,507

NONCOLLAPSIBLE PNEUMATIC TIRE

Hubert Quinn, North Providence, R. I.

Application April 26, 1941, Serial No. 390,626

15 Claims. (Cl. 152—330)

My invention relates to improvements in non-collapsible pneumatic tires.

This application is a continuation-in-part of my earlier application for Letters Patent for Non-collapsible pneumatic tire, S. N. 352,361, filed August 13, 1940.

An object of my invention is to provide a pneumatic tire having a plurality of independent rigid supporting means arranged circumferentially within the tire casing exterior of the pneumatic tube and normally urged by said tube when inflated to an inoperative position permitting the usual resiliency of said tire and means to successively urge said independent rigid supporting means to a position rigidly supporting the walls of said tire casing as the tire rotates away from the ground on continued rotation of said tire after deflation of said tube so that while there may be a slight initial collapsing of the tire casing immediately after deflation of a portion of the casing, when said portion again strikes the ground it will be rigidly supported.

An object of my invention therefore, is to provide a greater measure of safety in the event of a blow-out, for before there is a chance of any accident to happen, the tire casing will be rigidly supported to permit the continued control and driving of the vehicle.

A further object of my invention is to largely eliminate the destruction of the tire casing by rim cuts or other fabric lacerations after blow-outs or punctures, and thereby lengthen the life of an ordinary tire casing or shoe, rendering it capable of continued use after a succession of blow-outs or punctures.

I believe I am the first to provide the principle in a pneumatic tire of having spring or other means adapted to selectively interpose solids between the tire casing outer tread wall and the rim to take the place of air pressure within said tire after a blow-out or puncture and to cause the tire to resume its normal safe operating position with the side walls of the tire casing rigidly supported.

A further object of my invention is to provide, in an embodiment shown, a larger tire and air cushion by means of the tri-tubular tube I preferably employ in one embodiment thereof than is employed in present-day tires.

A further object of my invention is to provide in said embodiment a structure whereby said solids will be automatically moved out of the way on the re-inflation of the tube to permit the usual pneumatic resiliency of the tire in use.

A further object of my invention in a different embodiment thereof is to provide a device embodying these principles which may be attached to a standard rim without any modification thereof and employing a single tube.

A further object of my invention is to provide a device which will retain the natural shape of the tire even after a puncture or a blow-out to prevent its so collapsing as to tend to fly off the rim.

Further features of my invention relate to improvements in the various structural parts of my invention.

These and such other objects of my invention as may hereinafter appear will be best understood from a description of the embodiments thereof shown in the accompanying drawings.

I have shown in Figs. 1-7 of the drawings one embodiment of my invention in which the solid supporting parts are automatically moved into a position to support the tread on deflation of the tube and in which said supporting parts are automatically moved to a position not supporting the tread on reinflation of the tube to permit the ordinary resiliency of the tire.

I have shown in Figs. 8-14 a different embodiment of my invention which may be readily attached to a standard type of rim without modification of the rim and employing a single tube.

Referring to the embodiment shown in Figs. 1-7 of the drawings, wherein like characters of reference generally indicate like parts throughout, 10 generally indicates a non-collapsible pneumatic tire constructed in accordance with my invention. While my invention may be constructed without modification of the rim 12, as shown in the embodiment shown in Figs. 8-14, in the embodiment shown in Figs. 1-7, I provide a continuous peripheral flange 14 securable to the center of the wheel rim 12 terminating in an enlarged continuous annular head 16 having a flat outer surface 18. In this embodiment, the flange 14 is in the general nature of a continuous circular I-beam having the I-portions 20 flaring outwardly immediately exterior of the rim and a hexagonal rim attaching portion 22 projecting integrally inwardly from the inner end 24 of said flange 14, said hexagonal portion 22 having its outer surface integrally attached to the inner end of the flange 14 and the flat inner surface 26 adapted to be flush with the inner rim surface 28, each side wall of said hexagonal portion 22 comprising the two outwardly tapering portions 30 tapering to a center line 32, thereby making up the hexagon with said inner and outer walls just described and providing side walls for said hexagonal attaching portions tapering outwardly to a center line 32. To embrace each end of said hexagonal attaching portion 22, I preferably centrally split the rim 12. In the embodiment shown, the rim 12 comprises the portion 34 which may be permanently attached to the wheel felly and the removable portion 36, said portions being provided at their inner ends with the respective V-shaped grooves 38 and 40 to receive therein respectively each set of the tapered side walls 30 of the hexagonal attaching portion 22. Bolts 42 may project at intervals laterally from the groove 38 on said permanently attached portion 34 adapted to project through cooperating holes 44 in said hexagonal attaching portion 22 and suitably aligned holes 46 in said removable portion 36, said bolts being adapted to receive the nuts 48 on the threaded ends 50 thereof to detachably clamp said hexagonal attaching portion 22 between said rim portions 34 and 36. If desired a continuous clamping rim 52 is also provided with suitable holes 54 for receiving the bolts 42 therein and may be interposed between the free edge of said removable portion 36 and nuts 48.

In the embodiment shown, the outer surface of the rim is provided with suitable grooves 56 near each edge thereof for receiving the inner ends 58 of the side walls 60 of the usual tire casing or shoe 62 therein. For the insertion of the usual tube stem 64 the flange 14 is provided with the central radial hole 63 having the branch holes 66 therein, said branch holes 66 being provided with slits 68 extending radially outwardly to the outer surface of said flange 14. The hexagonal attaching portion 22 is also provided with the radial stem hole 65 for insertion of the tube within the shoe 62. It is obvious that the same means I have employed for attaching the flange 14 to the rim also functions to retain the tire casing 62 to the rim with the flange 14 projecting radially outwardly centrally within said attached casing 62 providing an outer chamber 70 exterior of said flat outer flange end surface 18 and a respective inner chamber 72ª and 72ᵇ on each side of said flange 14 within said casing 62. Where the corresponding parts for each respective side wall of the tire are not shown in the drawings or referred to by reference character in the drawings, it is understood that corresponding parts to those shown and described are employed for the opposite side wall, being exact duplicates of those shown in Figs. 5 and 6 for one side wall. Each side wall 60 of said casing 62 is provided with a flat continuous annular member 74ª or 74ᵇ covering the inner surface thereof and being provided at spaced intervals with spring means 76ª or 76ᵇ projecting inwardly thereof, and intermediate said spring means alternately as shown, with guide means 78ª or 78ᵇ also projecting inwardly thereof, in the embodiment shown, the guide means 78ª or 78ᵇ being interposed alternately between said spring means. Said members 74ª or 74ᵇ are made of hard rubber or other suitable material. In the embodiment shown, each annular member 74ª or 74ᵇ is provided with the respective holes 80ª or 80ᵇ on the inner wall thereof for receiving said spring means 76ª or 76ᵇ. In the embodiment shown I employ two springs in each spring means, a more powerful spring 82ª or 82ᵇ in its respective hole 80ª or 80ᵇ and an inner smaller spring 84ª or 84ᵇ respectively separated by an intermediate plate 86ª or 86ᵇ. The inner ends of the inner spring members 84ª or 84ᵇ abut the spaced arcuate flat sectional rigid supporting members 88ª or 88ᵇ. Said members 88ª or 88ᵇ are preferably constructed of a strong rigid material, such as metal. The respective ends of the springs are rigidly attached by welding or otherwise to the rigid supporting members 88ª or 88ᵇ, the inner and outer surfaces of the respective plates 86ª or 86ᵇ and the outer ends of the respective holes 80ª or 80ᵇ.

In the embodiment shown, the respective guide means 78ª or 78ᵇ comprise a plurality of telescoping members. As shown in detail in Fig. 6, a hole 90ª or 90ᵇ is provided for each respective guide means 78ª or 78ᵇ intermediate the respective holes 80ª or 80ᵇ for said respective springs 76ª or 76ᵇ. The inner surface of each hole 90ª or 90ᵇ is provided with an inwardly projecting flange 92ª or 92ᵇ respectively. I also provide a respective inner and a respective outer piston and cylinder member 94ª or 94ᵇ and 96ª or 96ᵇ. Each outer respective piston cylinder member 96ᵃ or 96ᵇ has an annular piston portion 98ᵃ or 98ᵇ at the outer end thereof adapted to reciprocate within its respective hole 90ᵃ or 90ᵇ, and a central cylinder portion 100ᵃ or 100ᵇ projecting centrally inwardly thereof and terminating in an inwardly projecting annular flange 102ᵃ or 102ᵇ at the inner end thereof. Each respective inner piston and cylinder member 94ᵃ or 94ᵇ also has the annular piston portion 104ᵃ or 104ᵇ at the outer end thereof adapted to reciprocate within the cylinder portion 100ᵃ or 100ᵇ of the outer piston and cylinder member 96ᵃ or 96ᵇ, and a central cylinder portion 106ᵃ or 106ᵇ projecting centrally inwardly thereof and terminating in an inwardly projecting annular flange 108ᵃ or 108ᵇ at the inner end thereof. A stem 110ᵃ or 110ᵇ is attached to the respective rigid supporting member 88ᵃ or 88ᵇ and forms the stem of a piston projecting through a central hole 112ᵃ or 112ᵇ in the inner end of the cylinder portion 106ᵃ or 106ᵇ and has the piston 114ᵃ or 114ᵇ at the outer end thereof adapted to reciprocate in said cylinder portion 106ᵃ or 106ᵇ of its inner piston and cylinder member 94ᵃ or 94ᵇ. It is obvious that the outer edges of the respective pistons 98ᵃ or 98ᵇ, 104ᵃ or 104ᵇ and 114ᵃ or 114ᵇ abutting the inner surfaces of the walls of the respective cylinders 90ᵃ or 90ᵇ, 100ᵃ or 100ᵇ and 106ᵃ or 106ᵇ keep the respective guide means in alignment. A duct 116ᵃ or 116ᵇ projects inwardly from the outer end of the base of each cylinder hole 90ᵃ or 90ᵇ to permit the ingress and egress of air from the respective cylinders 106ᵃ or 106ᵇ, 100ᵃ or 100ᵇ and 90ᵃ or 90ᵇ on reciprocation of the respective pistons 98ᵃ or 98ᵇ, 104ᵃ or 104ᵇ and 114ᵃ or 114ᵇ. The reciprocating movement of the piston 98ᵃ or 98ᵇ is limited by the base of the cylinder 90ᵃ or 90ᵇ and the respective flange 92ᵃ or 92ᵇ. The reciprocating movement of each piston 104ᵃ or 104ᵇ is limited by the respective supporting member 88ᵃ or 88ᵇ striking the inner surface of the flange 102ᵃ or 102ᵇ and by the respective piston 104ᵃ or 104ᵇ striking the outer surface of the flange 102ᵃ or 102ᵇ. The reciprocating movement of the piston 114ᵃ or 114ᵇ is limited by the respective attaching member 88ᵃ or 88ᵇ striking the inner surface of the flange 112ᵃ or 112ᵇ and the respective piston 114ᵃ or 114ᵇ itself striking the outer surface of the respective flange 112ᵃ or 112ᵇ.

Figure 7:
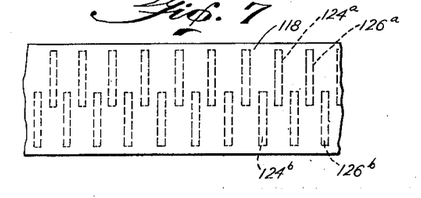
Fig. 7 is a fragmentary plan view of a portion of the lining I preferably employ.

I also provide a flat annular lining 118 covering the inner surface of the tire casing outer tread wall 120. In the embodiment shown, the lining 118 is constructed of elastic material, such as resilient rubber and has the spaced, reinforcing means embedded therein or affixed thereto. In the embodiment shown, said spaced reinforcing means comprises, as shown in Fig. 7, two rows 124ᵃ and 124ᵇ of longitudinally spaced cross rods 126ᵃ and 126ᵇ embedded therein with the rods in one row being staggered relative to the rods in the other row, which rods may be constructed of suitable resilient metal wire.

Figures 1, 2, 3:
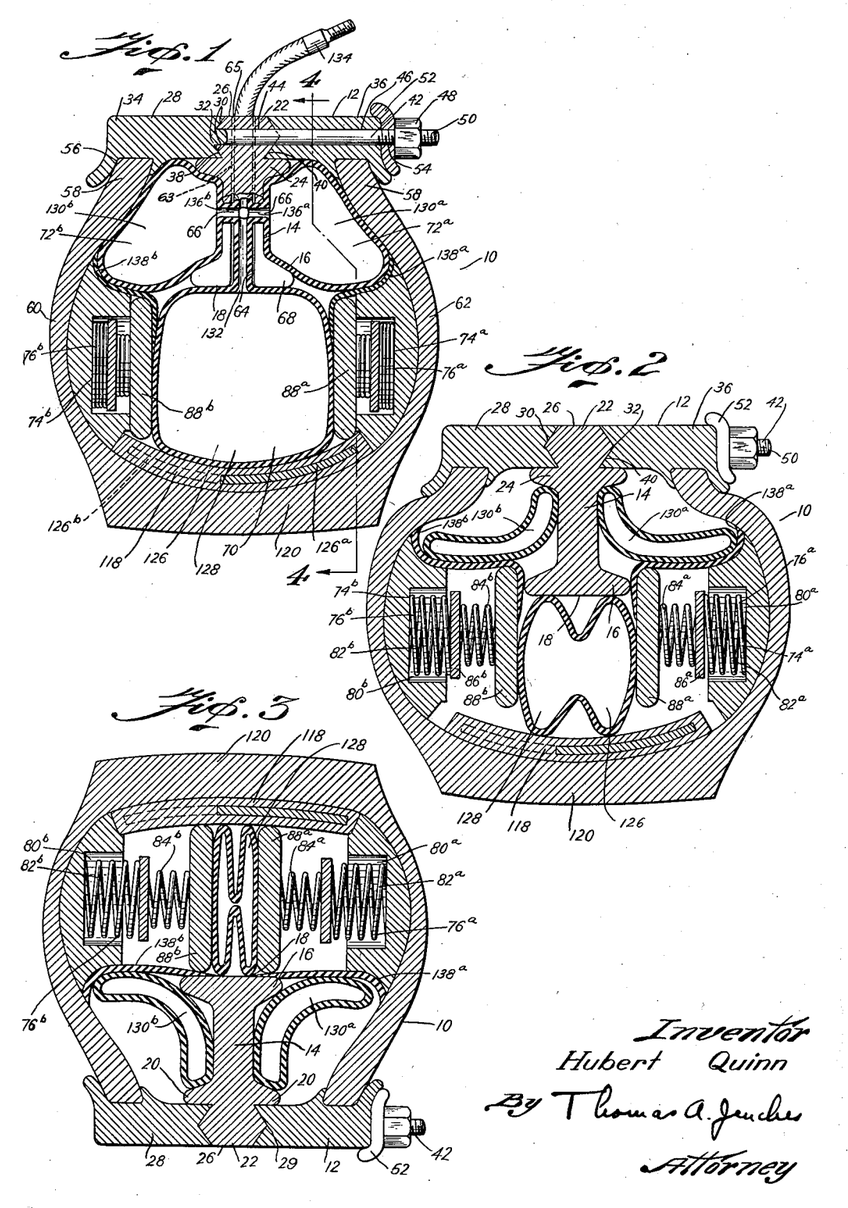
Fig. 1 is a vertical cross sectional view taken through a portion of one embodiment of a non-collapsible pneumatic tire constructed in accordance with my invention as it abuts the ground having a rim modified in accordance with my invention and with the tube in inflated operating condition.
Fig. 2 is a vertical cross sectional view similar to Fig. 1 illustrating the position the parts assume the instant the tube collapses.
Fig. 3 is a vertical cross sectional view taken through a portion of the tire not in contact with the ground illustrating the position the parts of the same portion of the tire shown in Figs. 1 and 2 assume immediately after said portion of the tire has left the ground with the independent rigid supporting means successively brought in position to support the tire tread when said portion again comes in contact with the ground.
Figure 4:
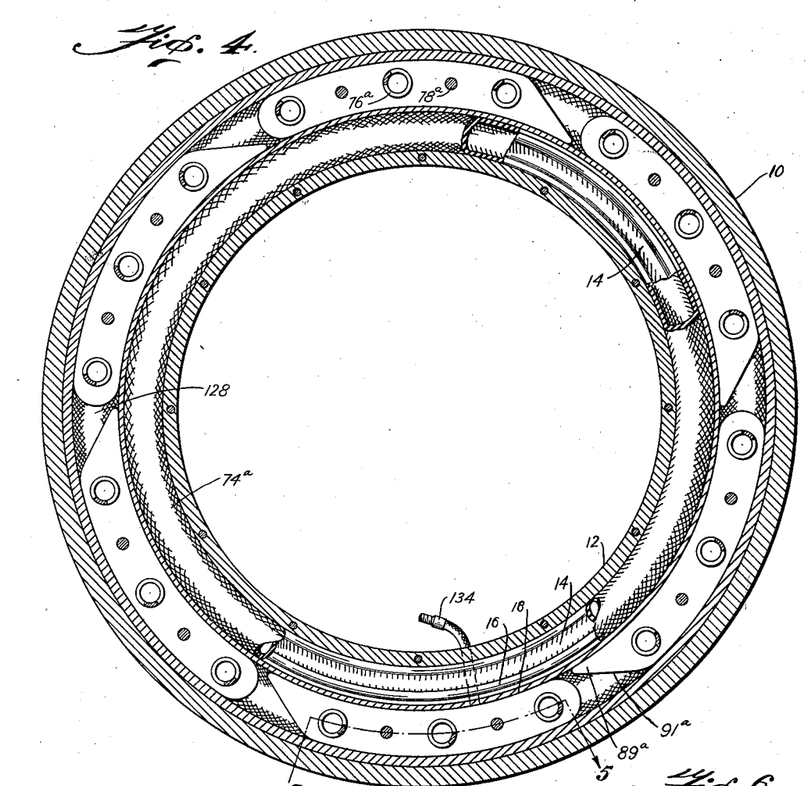
Fig. 4 is a vertical circumferential sectional view taken along the line 4—4 of Fig. 1.
Figure 5:
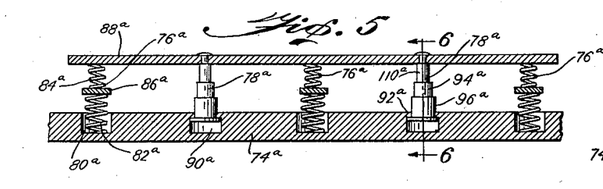
Fig. 5 is a detailed sectional view taken along the line 5—5 of Fig. 4.
Figure 6:
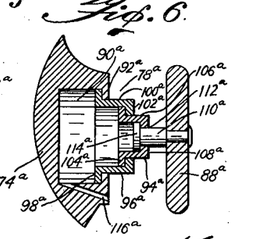
Fig. 6 is a cross sectional view taken through the improved type of guide means I preferably employ along the line 6—6 of Fig. 5.

I also employ a plurality of spaced arcuate flat sectional rigid supporting members 88ᵃ or 88ᵇ mounted on said respective spring means 76ᵃ or 76ᵇ and guide means 78ᵃ or 78ᵇ as hitherto described, adapted to be forced inwardly between said flange head 16 and lining 118 by said respective spring means 76ᵃ or 76ᵇ. These members 88ᵃ or 88ᵇ are constructed of rigid material such as metal and are of a strength when interposed between the lining 118 and flat flange surface 18 as shown in Fig. 3, to support the tire casing 62 to positively prevent any strain on the side walls 60 thereof. The lining 118 is employed to prevent the supporting members 88ᵃ or 88ᵇ from cutting the tread surface 120 of the tire casing or shoe 62. I also employ the usual pneumatic tube 126 to give the usual pneumatic elasticity to the tire and said tube 126 includes the tubular portion 128 adapted to be mounted in said outer chamber 70 between said flange surface 18 and lining 118 and adapted when inflated to push the rigid supporting members 88ᵃ or 88ᵇ out of radial alignment with the flange 14 compressing the spring means 76ᵃ or 76ᵇ and collapsing the guide means 78ᵃ or 78ᵇ for this purpose. In the embodiment shown, said tube 126 comprises a plural tube having in addition to the portion 128, a supplemental tubular portion 130ᵃ or 130ᵇ in each of said inner chambers 72ᵃ or 72ᵇ exterior of the side walls of said flange 14. In the embodiment shown each of said tubular portions 128, 130ᵃ and 130ᵇ is respectively connected to the others. For this purpose the tubular portion 128 is provided with the usual stem conduit 132 of small diameter projecting outwardly to the valve 134 through the radial hole 64 in said flange 14 and radial hole 65 in said hexagonal portion 22 hitherto described. Said tubular conduit 132 is provided with the branch tubular conduits 136ᵃ and 136ᵇ also of small diameter connecting said conduit 132 to the respective tubular portions 130ᵃ and 130ᵇ, it being thus obvious that when the tube is inflated the respective tubular portions 128 and 130ᵃ and 130ᵇ are respectively connected to each other by said conduits 132 and 136ᵃ and 136ᵇ respectively. If desired, interlinings 138ᵃ or 138ᵇ may be interposed between the tubular portion 128 and the respective tubular portions 130ᵃ or 130ᵇ.

As will be apparent, my improved pneumatic tire will function quicker and better if a large plurality of supporting members 88ᵃ or 88ᵇ be employed. In the embodiment shown, I have shown six such supporting members each mounted on three spring means 76ᵃ or 76ᵇ and having two guide means 78ᵃ or 78ᵇ interposed between the respective spring means 76ᵃ or 76ᵇ. If desired, the respective supporting members 88ᵃ or 88ᵇ may each be provided with a pointed front end 89ᵃ or 89ᵇ with the outer wall thereof tapering radially inwardly to the inner wall thereof to provide said point, thus providing an inclined plane surface 91ᵃ or 91ᵇ for the more facile insertion of the supporting members underneath the head 16 of the flange 14 on rotation of the tire in use. The means I employ to inflate said plural tube includes the valve 134 mounted on the end of the conduit 132, as colloquially called in the trade the "valve stem." When a suitable pump is attached to the valve 134 air is inserted through the conduit 132 into the tubular portion 128 and through the respective branch conduits 136ᵃ and 136ᵇ into the tubular portions 130ᵃ and 130ᵇ. As the tubular portion 128 becomes inflated it is obvious that the rigid supporting members 88ᵃ and 88ᵇ are spread laterally outwardly out of radial alignment with the head 16 of the flange 14 as shown in Fig. 1, the spring means 76ᵃ and 76ᵇ and guide means 78ᵃ and 78ᵇ collapsing within their respective holes 80ᵃ and 80ᵇ and 90ᵃ and 90ᵇ as pneumatic pressure is applied to the tubular portion 128, all said tubular portions 128 and 130ᵃ and 130ᵇ being thus inflated to give the usual pneumatic resiliency to the tire.

Should the tire strike an obstruction in use, it is obvious that the supporting members 88ª and 88ᵇ will freely rise in the chambers 72ª and 72ᵇ, the respective tubular portions 130ª and 130ᵇ compressing for this purpose. Thus in use my improved pneumatic tire assumes the position shown in Fig. 1. I have shown in Fig. 2 the position the parts take immediately after a puncture or blow-out causes deflation of the respective tubular portions 128 and 130ª and 130ᵇ, the spring means 76ª and 76ᵇ immediately urging the rigid supporting members 88ª and 88ᵇ inwards and the walls 60 of the tire casing 62 tending to temporarily collapse for a short period of time. When, however, the respective individual casing portions opposite said respective sectional supporting members 88ª and 88ᵇ are free of the ground, the resiliency of the walls 60 of the casing 62 will tend to raise the respective casing portions to their normal position and the respective spring means 76ª and 76ᵇ will then be able to immediately push their respective individual supporting members 88ª and 88ᵇ into radial alignment between the head 16 of the flange 14 and the lining 118 as shown in Fig. 3. It is obvious that when the portions opposite the respective sections leave the ground on rotation of the tire that the individual sections 88ª and 88ᵇ will be pushed by their respective springs into the position shown in Fig. 3, so that when said respective portion of the tire shown in Fig. 2 again strikes the ground the parts will be in the position shown in Fig. 3 and so that the respective edges of said supporting members 88ª and 88ᵇ thereof will abut the head 16 of the flange 14 and the reinforcing lining 118 respectively to positively support the outer tread surface 120 of the tire away from the rim 12 so that no strain will be brought on the walls 60 of the tire casing.

I have shown in Figs. 8-14 a different embodiment of my invention employing a single tube and which may be employed on a standard type of rim. While any type of rim and tire casing attaching means may be employed, I have shown in the drawings a standard detachable tire in which the rim 140 is rigidly attached as usual to the wheel felly 142 of an artillery wheel and is detachably mounted thereon by means of the usual split side flange 144 fitting into the usual groove 146 provided therefore adjacent the outer edge of the rim 140. While the solid members 148 adapted to be interposed between the rim 140 and the tire tread to support the tread surface 150 of the shoe 152 may be constructed as a separate attachment, as shown in the embodiment shown in Figs. 1-7 adapted to fit in any part of the shoe, in this embodiment I have specifically mounted them in the side walls 154 of the shoe or tire casing 152. The tire casing or shoe 152 thus has the outer tread portion 150 and the side walls 154 having inner ends 156 detachably securable to the wheel rim 140, which side walls 154 are provided with the internally thickened outer portions 158. Each of said thickened outer portions has a circumferential channel 160 projecting substantially radially outwardly from the inner surface 162 thereof, said channels being preferably substantially radial to the center of the wheel (not shown). It is apparent, however, that in place of said thickened portions 158 and circumferential channels 160, any other suitable type of supports may be provided for mounting the solid members 148 on the tire casing.

In this embodiment the solid members 148 comprise the pairs 149 of supporting members 148 pivotally mounted at alternate spaced distances circumferentially of said channels within said channels 160 and are pivotable to a closed position within said channels. For this purpose each supporting member 148 of a respective pair 149 is loosely mounted on a pivot pin 164 rigidly mounted in its respective channel in suitable holes 166 provided therefor in the side walls of the respective channels. The outer portion 165 of each respective supporting member containing the hole 168 for its loose pivotal mounting on a pivot pin 164 is substantially of disc shape and the oblong inner lug portion 167 projects radially therefrom. As stated, the supporting members 148 are pivotally mounted in pairs at alternate spaced distances circumferentially in the respective channels and, as also stated, said supporting members are adapted to function in pairs 149. For this purpose the respective pivot pins 164 for each respective pair are spaced apart substantially twice the radius of said disc shaped outer portions 165 so that their respective peripheries will abut. One of the respective disc portions 165 of each pair 149 of supporting members 148 is provided with a partially circumferential tongue 170 adapted to fit into a cooperating partially circumferential groove 171 in the respective other supporting member 148 of the pair 149, both for aligning purposes and to provide a braking action to keep the pivotable movement of each supporting member 148 of a pair 149 simultaneous. Means are provided, in the embodiment shown, spring means 172, to normally urge said supporting members to a radial position with the ends 174 of the lug portions 167 projecting inwardly from said channels to abut said rim 140 and support said tread surface 150. While any suitable type of spring means may be employed, I have shown in the drawings a spiral spring of the standard clock type made of highly tempered resilient wire, having one end 176 thereof rigidly affixed to a pivot pin 164, and the opposite end 178 abutting the free side wall 180 of the lug portion 167 of each pair away from its respective other supporting member 148 of each pair. I have shown in Fig. 12 the respective lug portions 167 of each pair raised by the respective springs 172 to their supporting positions. In order that the supporting members may function as a pair unit, the abutting surfaces 182 thereof when in this radial supporting position are provided with interlocking means, such as the projections 184 and 186 projecting from the abutting walls 182 of each respective member fitting into respective locking depressions 188 and 190 in the abutting walls of the respective supporting members 148.

As in the embodiment shown in Figs. 1-7, the inflated pneumatic tube 192 normally retains the pairs of supporting members 148 in a closed position within the respective channels 160. In the embodiment shown in Figs. 8-14 I am able to employ a single pneumatic tube 192 which comprises the outer portion 194 contained between the thickened portions 158 of the side walls 154 and a wider inner portion 196 filling out said casing 152 having outer walls 198 at each outer end thereof underlying said respective pairs 149 of supporting members 148 to retain said supporting members in a closed position within said circumferential channels 160. If desired, to protect the tube from the supporting members 148, circumferential flaps 200 may be interposed between the outer walls 198 of said tube inner portion 196 and said channels 160, being freely movable as shown in Figs. 9 and 10 on collapse of said tube 192 and subsequent raising of said supporting members 148 by the respective springs 172 to a position free of said channels 160 to permit the free raising of the inner ends 174 of said supporting lug portions 167 to the positions shown in Fig. 10, rigidly supporting the tire tread 150 against said rim 140.

Figures 8, 9, 10:
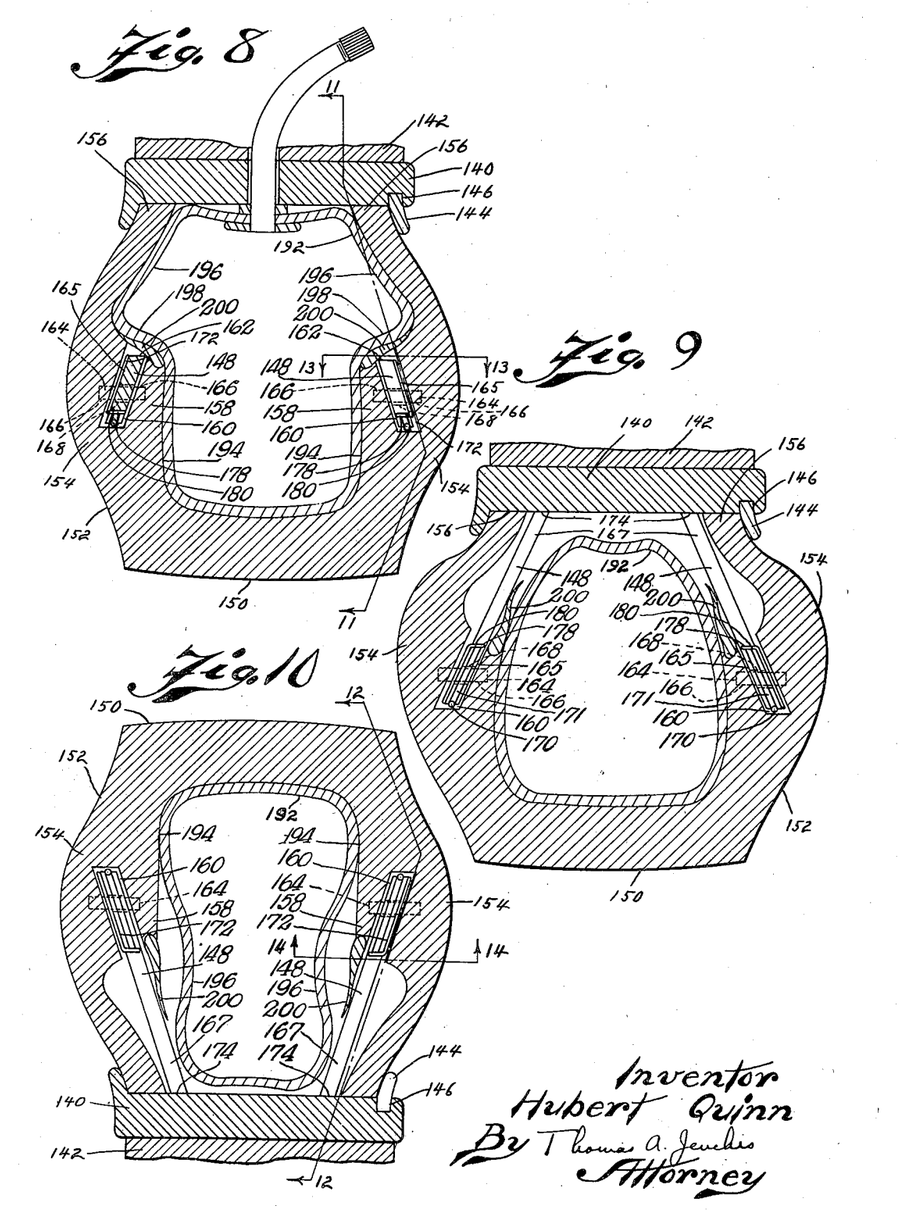
Fig. 8 is a vertical cross sectional view taken through a portion of a different embodiment of a non-collapsible pneumatic tire constructed in accordance with my invention as it abuts the ground with the single tube employed in this embodiment in inflated operative condition.
Fig. 9 is a vertical cross sectional view similar to Fig. 8 illustrating the position the parts assume the instant the tube collapses.
Fig. 10 is a vertical cross sectional view taken through a portion of the tire not in contact with the ground, illustrating the position the parts of the same portion of the tire shown in Figs. 8 and 9 assume immediately after said portion of the tire has left the ground with the independent rigid supporting means successively brought into position to support the tire tread when said portion again comes in contact with the ground.
Figure 11:
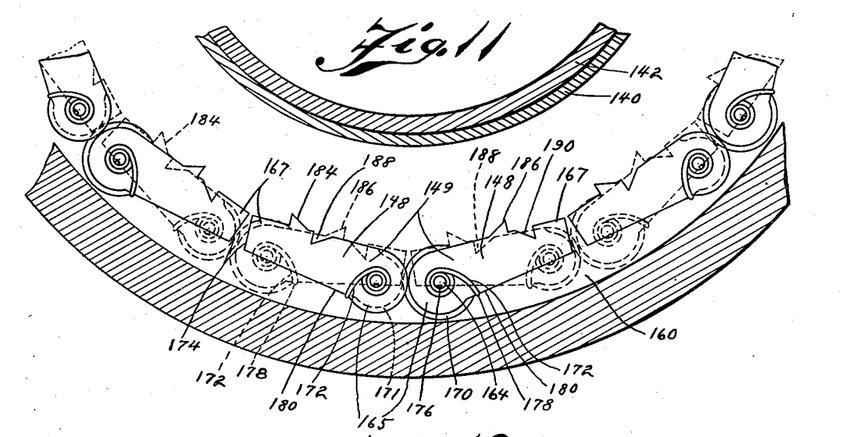
Fig. 11 is a sectional view taken along the line 11—11 of Fig. 8 with the tube not shown.
Figures 12, 13, 14:
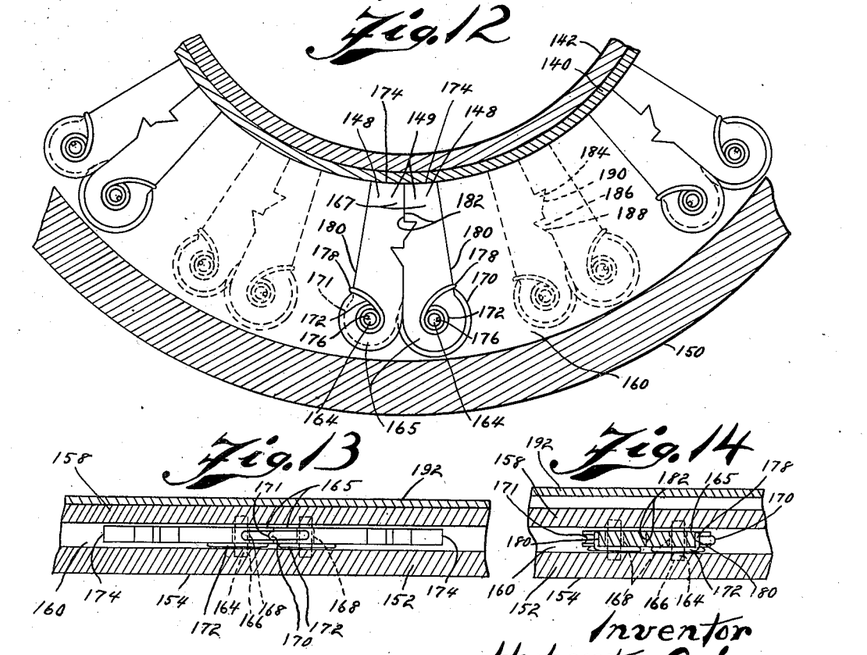
Fig. 12 is a sectional view taken along the line 12—12 of Fig. 10 with the tube not shown.
Fig. 13 is a cross sectional view taken along the line 13—13 of Fig. 8.
Fig. 14 is a cross sectional view taken along the line 14—14 of Fig. 10.

As shown in Figs. 8-10, this embodiment of my invention performs substantially the same function as the embodiment of my invention shown in Figs. 1-7. When the tire is in use the tube 192 is fully inflated to give the usual pneumatic resiliency to the tire, and with the outer walls 198 of its inner portion 196 abutting the respective flaps 200, which in turn abut the inner ends 174 of the lug supporting portions 167 to retain them in a depressed position within their respective channels 160 against the pressure of the springs 172 normally urging them to a raised position. I have shown in Fig. 9 the position the parts take immediately after a puncture or a blow-out, causing deflation of the tube 192, the spring means 172 immediately urging the rigid supporting members 148 inwards and the walls 154 of the shoe 152 tending to temporarily collapse for a short period of time. When, however, the respective casing portions opposite the respective pairs 149 of supporting members 148 are free of the ground, the resiliency of the walls 154 of the casing 152 will tend to raise the respective casing portions to their normal position, and the respective spring means 172 will then be able to immediately push their respective individual supporting members 148, functioning as a unit pair 149, into radial alignment between the rim 140 and the tread 150, as shown in Fig. 10, so that when said respective portion of the tire shown in Fig. 9 again strikes the ground the parts will be in the position shown in Fig. 10 and so that the respective inner ends 174 of said supporting members 148 will abut the rim 140 to positively support the outer tread surface 150 of the tire away from the rim 140 so that no strain will be brought on the walls 154 of the tire casing.

It is obvious that this rigid supporting of the side walls of the tire will positively prevent rim cuts and other tire fabric lacerations and will immediately permit all portions of the tire to assume the pseudo inflated or rigid position shown in Fig. 3 and Fig. 10 to permit the vehicle to travel forward on an even keel so to speak, and thereby prevent accidents and injury to the tube and casing.

It is thus obvious that whatever collapsing of the tube may take place is only temporary and does no harm to the walls of the tire and does not affect the steering of the vehicle.

It is also apparent that with the walls of the tire casing so supported the tire may be temporarily used after a puncture permitting the vehicle to continue operating until the tire may be repaired at the driver's convenience.

It is understood that my invention is not limited to the specific embodiments shown and that various deviations may be made therefrom without departing from the spirit and scope of the appended claims.

What I claim is:

1. A non-collapsible pneumatic tire, comprising a continuous peripheral flange securable to the center of a wheel rim terminating in an enlarged continuous annular head having a flat outer surface, a tire casing detachably securable to said rim with said flange projecting centrally within, providing an outer chamber exterior of said flat outer flange head surface and an inner chamber on each side of said flange within said casing, a flat annular member covering each side wall of said casing having spaced spring means and guide means projecting inwardly thereof, an elastic annular lining covering the inner surface of the tire casing outer tread wall having spaced reinforcing means embedded therein, a plurality of spaced arcuate flat sectional rigid supporting members independently mounted on said spring means and guide means to be forced inwardly between said flange head and lining by said spring means, a plural pneumatic tube comprising a tubular portion in said outer chamber and a tubular portion in each of said inner chambers pneumatically connected to the other respective tubular portions and means to inflate said plural tube, with the inflation of said outer tubular portion pushing said sectional supporting members free of said flange head whereby on deflation of said tube, said arcuate sectional supporting members may be selectively urged by said spring means to positions between said flange head and lining on rotation of said tire to rigidly support said tire casing without deflation of said casing and strain on the side walls thereof on continued rotation of said tire.

2. A non-collapsible pneumatic tire, comprising a continuous peripheral flange securable to the center of a wheel rim terminating in an enlarged continuous annular head having a flat outer surface, a tire casing detachably securable to said rim with said flange projecting centrally within, providing an outer chamber exterior of said flat outer flange head surface, a flat annular member covering each side wall of said casing having spaced spring means projecting inwardly thereof, an annular lining covering the inner surface of the tire casing outer tread wall, a plurality of spaced arcuate flat sectional rigid supporting members independently mounted on said spring means to be forced inwardly between said flange head and lining by said spring means, a pneumatic tube in said outer chamber and means to inflate said tube, with the inflation of said tube pushing said sectional supporting members free of said flange head whereby on deflation of said tube, said arcuate sectional supporting members may be selectively urged by said spring means to positions between said flange head and lining on rotation of said tire to rigidly support said tire casing without deflation of said casing and strain on the side walls thereof on continued rotation of said tire.

3. A non-collapsible pneumatic tire, comprising a continuous peripheral flange securable to the center of a wheel rim terminating in an enlarged continuous annular head having a flat outer surface, a tire casing detachably securable to said rim with said flange projecting centrally within, providing an outer chamber exterior of said flat outer flange head surface and an inner chamber on each side of said flange within said casing, a flat annular member covering each side wall of said casing having spaced spring means projecting inwardly thereof, an annular lining covering the inner surface of the tire casing outer tread wall, a plurality of spaced arcuate flat sectional rigid supporting members independently mounted on said spring means to be forced inwardly between said flange head and lining by said spring means, a plural pneumatic tube comprising a tubular portion in said outer chamber and a tubular portion in each of said inner chambers pneumatically connected to the other respective tubular portions, and means to inflate said plural tube, with the inflation of said outer tubular portion pushing said sectional supporting members free of said flange head whereby on deflation of said tube, said arcuate sectional supporting members may be selectively urged by said spring means to positions between said flange head and lining on rotation of said tire to rigidly support said tire casing without deflation of said casing and strain on the side walls thereof on continued rotation of said tire.

4. A non-collapsible pneumatic tire, comprising a continuous peripheral flange securable to the center of a wheel rim terminating in an enlarged continuous annular head having a flat outer surface, a tire casing detachably securable to said rim with said flange projecting centrally within, providing an outer chamber exterior of said flat outer flange head surface, a flat annular member covering each side wall of said casing having spaced spring means and guide means projecting inwardly thereof, an annular lining covering the inner surface of the tire casing outer tread wall, a plurality of spaced arcuate flat sectional rigid supporting members independently mounted on said spring means and guide means to be forced inwardly between said flange head and lining by said spring means, a pneumatic tube in said outer chamber, and means to inflate said tube, with the inflation of said tube pushing said sectional supporting members free of said flange head whereby on deflation of said tube, said arcuate sectional supporting members may be selectively urged by said spring means to positions between said flange head and lining on rotation of said tire to rigidly support said tire casing without deflation of said casing and strain on the side walls thereof on continued rotation of said tire.

5. A non-collapsible pneumatic tire, comprising a continuous peripheral flange securable to the center of a wheel rim terminating in an enlarged continuous annular head having a flat outer surface, a tire casing detachably securable to said rim with said flange projecting centrally within, providing an outer chamber exterior of said flat outer flange head surface, a flat annular member covering each side wall of said casing having spaced spring means projecting inwardly thereof, an elastic annular lining covering the inner surface of the tire casing outer tread wall having spaced reinforcing means embedded therein, a plurality of spaced arcuate flat sectional rigid supporting members independently mounted on said spring means to be forced inwardly between said flange head and lining by said spring means, a pneumatic tube in said outer chamber, and means to inflate said tube, with the inflation of said tube pushing said sectional supporting members free of said flange head whereby on deflation of said tube, said arcuate sectional supporting members may be selectively urged by said spring means to positions between said flange head and lining on rotation of said tire to rigidly support said tire casing without deflation of said casing and strain on the side walls thereof on continued rotation of said tire.

6. A non-collapsible pneumatic tire, comprising a continuous peripheral flange securable to the center of a wheel rim terminating in an enlarged continuous annular head having a flat outer surface, a tire casing detachably securable to said rim with said flange projecting centrally within, providing an outer chamber exterior of said flat outer flange head surface, a flat annular member covering each side wall of said casing having spaced spring means projecting inwardly thereof, an elastic annular lining covering the inner surface of the tire casing outer tread wall having staggered lines of spaced rigid cross rods embedded therein, a plurality of spaced arcuate flat sectional rigid supporting members independently mounted on said spring means to be forced inwardly between said flange head and lining by said spring means, a pneumatic tube in said outer chamber, and means to inflate said tube, with the inflation of said tube pushing said sectional supporting members free of said flange head whereby on deflation of said tube, said arcuate sectional supporting members may be selectively urged by said spring means to positions between said flange head and lining on rotation of said tire to rigidly support said tire casing without deflation of said casing and strain on the side walls thereof on continued rotation of said tire.

7. A non-collapsible pneumatic tire for a vehicle wheel rim, comprising a tire casing detachably securable to said rim, continuous supporting means projecting from said rim within said tire casing, an annular lining covering the inner surface of the casing outer tread wall, a pneumatic tube having a portion interposed between said supporting means and lining, a plurality of sectional rigid supporting members arranged circumferentially of said tire casing urged by said tube when inflated out of line with said supporting means and lining, and spring means operable on deflation of said tube to successively selectively urge said sectional supporting members into a position between said supporting means and lining to rigidly support said tire casing on continued rotation of said tire after deflation of said tube.

8. A non-collapsible pneumatic tire for a vehicle wheel rim, comprising a tire casing detachably securable to said rim, continuous supporting means projecting from said rim within said tire casing, a pneumatic tube having a portion interposed between said supporting means and tire casing outer tread wall, a plurality of sectional rigid supporting members arranged circumferentially of said tire casing urged by said tube when inflated out of line with said supporting means and tire casing outer tread wall, and spring means operable on deflation of said tube to successively selectively urge said sectional supporting members into a position between said supporting means and tire casing outer tread wall to rigidly support said tire casing on continued rotation of said tire after deflation of said tube.

9. A non-collapsible pneumatic tire for a vehicle wheel rim, comprising a tire casing detachably securable to said rim, a pneumatic tube contained within said tire casing, a plurality of movable rigid supporting members arranged circumferentially of said tire casing exterior of said tube and normally held by said inflated tube in an inoperative position permitting the usual pneumatic resiliency of said tire in use, and spring means operable on deflation of said tube to successively urge said rigid supporting members to a position rigidly supporting the tire tread on continued rotation of said tire after deflation of said tube.

10. A non-collapsible pneumatic tire for a vehicle wheel rim, comprising a tire casing detachably securable to said rim, a pneumatic tube contained within said tire casing, a plurality of movable rigid supporting members arranged circumferentially of said tire casing exterior of said tube and normally held by said inflated tube in an inoperative position permitting the usual pneumatic resiliency of said tire in use, and means operable on deflation of said tube to successively urge said rigid supporting members to a position rigidly supporting the tire tread on continued rotation of said tire after deflation of said tube.

11. A non-collapsible pneumatic tire for a vehicle wheel rim, comprising a tire casing detachably securable to said rim, a pneumatic tube contained within said tire casing, a plurality of movable independent rigid supporting means arranged circumferentially of said tire casing exterior of said tube and normally held by said inflated tube in an inoperative position permitting the usual pneumatic resiliency of said tire in use, and means operable on deflation of said tube to successively urge said independent rigid supporting means to a position rigidly supporting the tire tread on continued rotation of said tire after deflation of said tube.

12. A non-collapsible pneumatic tire, comprising a tire casing having an outer tread portion and side walls having inner ends detachably securable to a wheel rim and internally thickened outer portions, each having a circumferential channel projecting substantially radially outwardly from the inner surface thereof relative to the center portion of the wheel, a plurality of pairs of supporting members pivotally mounted at alternate spaced distances within said channels pivotable to a closed position within said channels, spring means normally urging said supporting members to a radial position abutting each other, with the ends thereof projecting inwardly from said channels to abut said rim and support said tread portion, and a pneumatic tube comprising an outer portion contained between the thickened portions of said side walls and a wider inner portion filling out said casing having outer walls at each side thereof underlying said supporting members to retain said supporting members in said closed position within said circumferential channels, and circumferential flaps interposed between said tube inner portion and channels movable on collapse of said tube by said supporting members to a position free of said channels.

13. A non-collapsible pneumatic tire, comprising a tire casing having an outer tread portion and side walls having inner ends detachably securable to a wheel rim and internally thickened outer portions, each having a circumferential channel projecting substantially radially outwardly from the inner surface thereof relative to the center portion of the wheel, a plurality of pairs of supporting members pivotally mounted at alternate spaced distances within said channels pivotable to a closed position within said channels, spring means normally urging said supporting members to a radial position abutting each other, with the ends thereof projecting inwardly from said channels to abut said rim and support said tread portion, and a pneumatic tube comprising an outer portion contained between the thickened portions of said side walls and a wider inner portion filling out said casing having outer walls at each side thereof underlying said supporting members to retain said supporting members in said closed position within said circumferential channels.

14. A non-collapsible pneumatic tire, comprising a tire casing having an outer tread portion and side walls having inner ends detachably securable to a wheel rim and internally thickened outer portions, each having a circumferential channel projecting substantially radially outwardly from the inner surface thereof relative to the center portion of the wheel, supporting members pivotally mounted within said channels pivotable to a closed position within said channels, spring means normally urging said supporting members to a radial position with the ends thereof projecting inwardly from said channels to abut said rim and support said tread portion, and a pneumatic tube comprising an outer portion contained between the thickened portions of said side walls and a wider inner portion filling out said casing having outer walls at each side thereof underlying said supporting members to retain said supporting members in said closed position within said circumferential channels and circumferential flaps interposed between said tube inner portion and channels movable on collapse of said tube by said supporting members to a position free of said channels.

15. A non-collapsible pneumatic tire, comprising a tire casing having an outer tread portion and side walls having inner ends detachably securable to a wheel rim and internally thickened outer portions, each having a circumferential channel projecting substantially radially outwardly from the inner surface thereof relative to the center portion of the wheel, supporting members pivotally mounted within said channels pivotable to a closed position within said channels, spring means normally urging said supporting members to a radial position, with the ends thereof projecting inwardly from said channels to abut said rim, and support said tread portion, and a pneumatic tube comprising an outer portion contained between the thickened portions of said side walls and a wider inner portion filling out said casing having outer walls at each side thereof underlying said supporting members to retain said supporting members in said closed position within said circumferential channels.

HUBERT QUINN.